US008272962B2

(12) United States Patent
Pacey

(10) Patent No.: US 8,272,962 B2
(45) Date of Patent: Sep. 25, 2012

(54) SOURCING OF ELECTRONIC WAGERING GAMES ACCESSED THROUGH UNAFFILIATED HOSTS

(75) Inventor: Larry J. Pacey, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 245 days.

(21) Appl. No.: 12/663,723

(22) PCT Filed: Jun. 23, 2008

(86) PCT No.: PCT/US2008/007798
§ 371 (c)(1),
(2), (4) Date: Dec. 9, 2009

(87) PCT Pub. No.: WO2009/005619
PCT Pub. Date: Jan. 8, 2009

(65) Prior Publication Data

US 2010/0178987 A1 Jul. 15, 2010

Related U.S. Application Data

(60) Provisional application No. 60/937,658, filed on Jun. 29, 2007.

(51) Int. Cl.
*A63F 13/00* (2006.01)

(52) U.S. Cl. ................................ 463/42; 463/20; 463/29

(58) Field of Classification Search .................... 463/16, 463/29, 30, 31, 33, 42
See application file for complete search history.

(56) References Cited

U.S. PATENT DOCUMENTS

2006/0154729 A1 7/2006 LeMay et al.
2006/0247039 A1* 11/2006 Lerner et al. .................... 463/29
2006/0258438 A1* 11/2006 Platis .............................. 463/25
2008/0064488 A1* 3/2008 Oh ................................. 463/25

FOREIGN PATENT DOCUMENTS

WO 2007/030766 A2 3/2007

OTHER PUBLICATIONS

Written Opinion corresponding to co-pending International Patent Application Serial No. PCT/US2008/007798, United States Patent Office; dated Oct. 2, 2008; 3 pages. International Search Report corresponding to co-pending International Patent Application Serial No. PCT/US2008/007798, United States Patent Office; dated Oct. 2, 2008; 3 pages.

Nguyen et al. (Ed.) 'AlbatrOSS: Architecture for Location Based Applications of Third generation Operation Support Systems'. IST-2001-24780; dated Jul. 31, 2002; 97 pages.

United Kingdom Examination Report corresponding to co-pending United Kingdom Patent Application Serial No. 0921575.7, United Kingdom Intellectual Property Office, dated Nov. 30, 2011; (7 pages).

* cited by examiner

*Primary Examiner* — James S McClellan
(74) *Attorney, Agent, or Firm* — Nixon Peabody LLP

(57) ABSTRACT

The play of a wagering game by a user on the user's computing device is supported while a web page from a host server is displayed on the user's screen. The game is contained in a window on the web page, but the game is under the control of a server. The user's computing device downloads a module of an application that supports play of the wagering game. Requests from the user's computing device for critical game information is routed via the host server to the source server. A reply to this request is transmitted from the source server via the host server to the user's computing device thereby permitting play of the game within web page window as displayed on the user's screen. The host server controls the subject matter displayed on the web page outside the window containing the wagering game.

14 Claims, 3 Drawing Sheets

SOURCING OF ELECTRONIC WAGERING GAMES ACCESSED THROUGH UNAFFILIATED HOSTS

CROSS-REFERENCE TO RELATED APPLICATIONS

This application is a U.S. National Stage of International Application No. PCT/US2008/007798, filed Jun. 23, 2008, which claims the benefit of U.S. Provisional Application Ser. No. 60/937,658, filed on Jun. 29, 2007, both of which are incorporated herein by reference in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2007 WMS Gaming Inc.

FIELD OF THE INVENTION

The present invention relates generally to hosting of electronic wagering games, and more particularly to the presentation of such games through a remote host that is not affiliated with a source host that maintains control of critical game data.

BACKGROUND OF THE INVENTION

Electronic wagering games, such as video slots and video poker, are available for play from various internet based sites. Typically a provider of such games supports play of the offered games from a host server for a plurality of users that use their computers to connect to the server via the internet. If the demand by users exceeds the capacity of one host server, then the vendor may employ additional servers to accommodate all of the users. However, the servers are all under the control of the same vendor. Some games may be proprietary to a vendor and hence are only available from that vendor's server. Users may desire to play a variety of games, some being only available from one vendor's server and other games only being available from another vendor's server. This forces the users to navigate to the various servers in order to gain access to the desired games. Therefore, a need exists to minimize the users' burden of having to navigate to different web sites in order to access a variety of desired games.

SUMMARY OF THE INVENTION

According to one aspect of the present invention, an embodiment includes an illustrative method wherein the play of a wagering game by a user on the user's computing device is supported while a web page from a host server is displayed on the user's screen. The game is contained in a window on the web page, but the game is under the control of a source server. The user's computing device downloads via the host server a module of an application support service that supports play of the first wagering game within the window. Requests for critical information required for play of the game from the user's computing device is routed via the host server to the source server. A reply to the critical information request is transmitted from the source server via the host server to the user's computing device thereby permitting play of the first game within the window of the web page as displayed on the screen of the user's computing device. The host server controls the subject matter displayed on the web page outside the window containing the wagering game.

According to other aspects of the invention, embodiments include a source server and a host server adapted to implement respective portions of the method.

According to yet another aspect of the invention, a computer readable tangible storage medium is encoded with instructions for enabling the practice of the method by the source server and host server.

Additional aspects of the invention will be apparent to those of ordinary skill in the art in view of the detailed description of various embodiments, which is made with reference to the drawings, a brief description of which is provided below. The use of the same reference numeral in the drawings is utilized to denote identical or similar elements.

DETAILED DESCRIPTION

Various embodiments of this invention can be utilized. The drawings and descriptions of embodiments of the invention exemplify its principles and are not intended to limit the broad aspect of the invention to only the illustrated embodiments.

Figure 1:
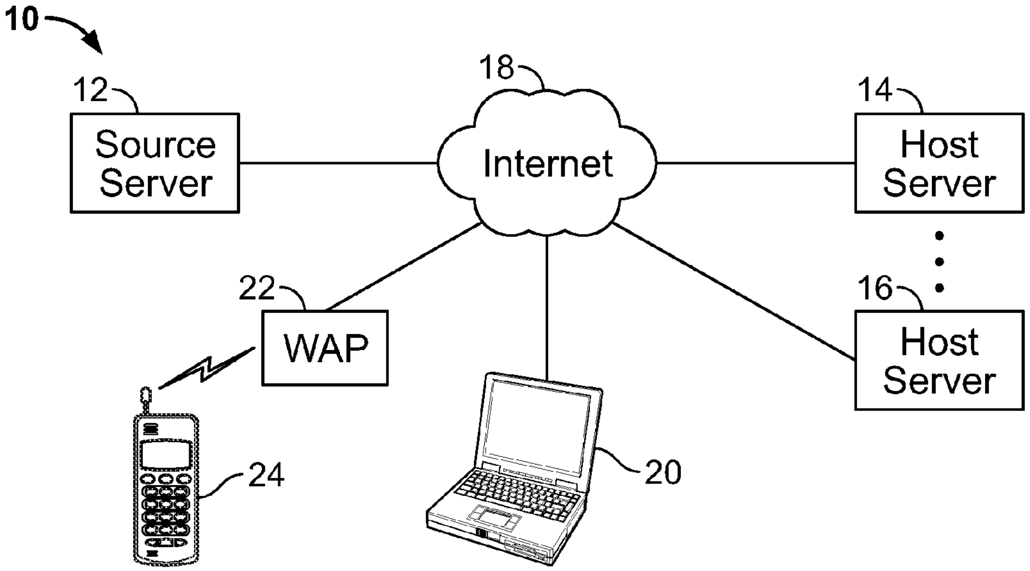
FIG. 1 is a block diagram of a gaming system suited for incorporation of an embodiment of the present invention.

FIG. 1 shows an illustrative gaming system 10 that includes a source server 12 and a host servers 14-16 coupled by the Internet 18. In this example the source server 12 is controlled by the owner of one or more wagering games. The host servers 14-16 may be owned and controlled by various entities that seek to provide an access site for users of various subject matter. User communication devices, of which communication device 20 is an example, are also coupled to the Internet 18. The communication device 20 will typically comprise a desk top or laptop personal computer that includes a browser and supports TCP/IP Internet communications with other nodes connected to the Internet 18. A wireless access point (WAP) 22 is also coupled to the Internet 18 and supports wireless communications with wireless communication devices 24 such as a personal digital assistant. It will be apparent that other types of wireless communication devices such as a laptop computer with wireless communication capabilities, a cellular telephone with interactive capabilities, etc. could also be utilized. In this illustrative application, the user communication devices will have bidirectional communication capabilities with the internet in order to support interactive play of a wagering game.

Figure 2:
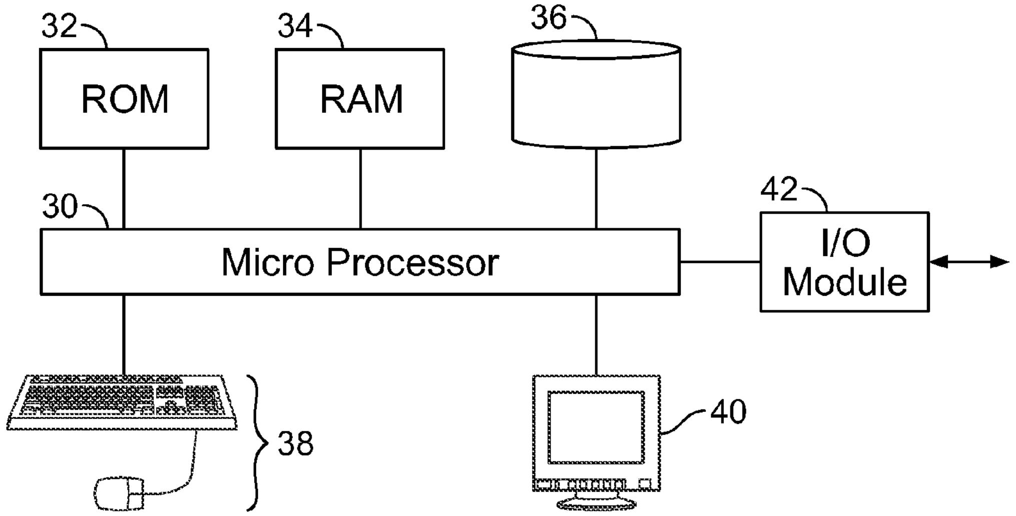
FIG. 2 is a block diagram of a representative architecture of elements of FIG. 1.

FIG. 2 shows an architecture that is applicable to the servers and user communications devices of FIG. 1. A central processing unit (microprocessor) 30 is supported by read-only memory (ROM) 32, random access memory (RAM) 34, and a nonvolatile storage memory such as a hard drive 36.

Input devices 38 such as a keyboard and/or mouse support the local entry of data and/or commands. Output devices 40 such as a monitor support the conveyance of information to a local operator. A communications input/output module 42 facilities bidirectional communications between the CPU 30 and external nodes over a wired or wireless communications link.

As will be appreciated by those skilled in the art, the functionality provided by the structure shown in FIG. 2 is determined by the system level software and applications that provide operational control of it. Program control instructions are initially stored in ROM 32 and the hard drive 36. Following the initial boot-up process, at least part of the program control instructions is loaded into the RAM 34 to facilitate run-time operation. One or more application programs running on the structure provide higher level functionality associated with the respective nodes. For example, source server 12 stores various wagering games and provides critical recordkeeping and data support associated with the play of such wagering games. The host servers 14-16 contain programs that host one or more web sites that are accessed by users. The host servers support the play of a wagering game located at source server 12 while the user remains directly supported by a web page hosted by a host server. The user communication device will contain programs such as a browser that supports TCP/IP and HTML functionality so that bidirectional communications are supported between the user's communication device and the servers. Application support services such as capabilities supported Sun's JAVA, Adobe's FLASH or other similar support services are preferably utilized to implement the illustrative embodiments of methods in accordance with the present invention as described below.

Figure 3:
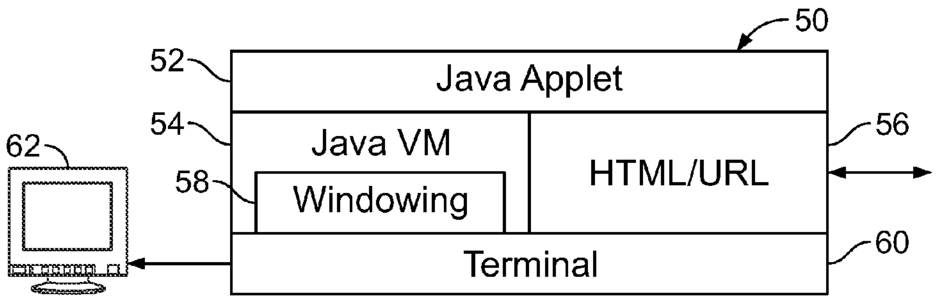
FIG. 3 is a representative software structure for an illustrative server.

FIG. 3 shows a representative software structure 50 for the source and host servers. In the illustrative example Java is utilized to provide the interactive functionality that will be described below. As will be understood by those skilled in the art, the illustrative software structure is supported by system level software, such as Microsoft's Windows. One or more Java applets 52 are utilized as needed to provide the needed functionality. As will be known to those skilled in the art, the instructions and data contained in Java applets 52 are interpreted by a Java Virtual Machine (VM) 54. HTML/URL and TCP/IP services 56 are provided by the Internet servers. "Windowing" services 58 supported by both Java and the system level software provide for the rendering of images which are coupled to terminal level support 60 that supplies the images to a monitor 62. A display of images associated with a server is provided so that an administrator can monitor the ongoing functionality and status of the server. Administrator input of commands and data to the server is also supported.

Figure 4:
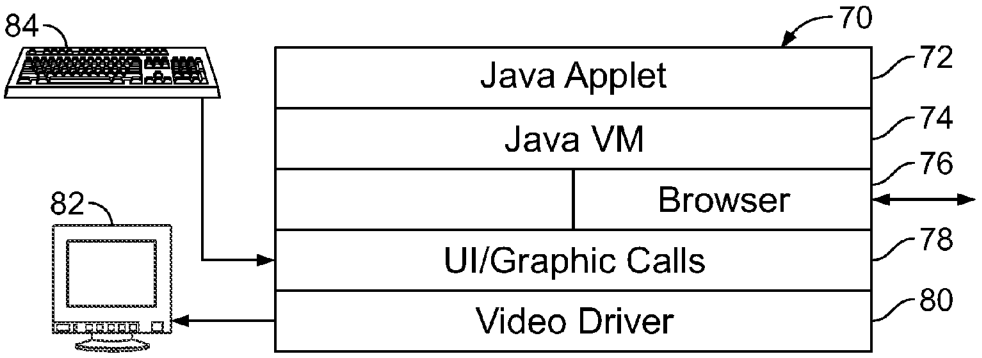
FIG. 4 is a representative software structure for an illustrative user's communication device.

FIG. 4 shows a representative software structure 70 for the user's communication device, for example a personal computer. In this example Java provides the interactive functionality that will be described below for the user's personal computer. The illustrative software structure 70 is supported by system level software, such as Microsoft's Windows or Vista, and one or more Java applets 72 to provide the needed functionality. The instructions and data contained in the Java applets are interpreted by the Java VM 74. A browser 76 provides HTML/URL and TCP/IP services for Internet communications by the personal computer. User interface (UI) and graphic call services 78 facilitate input and output communications with the user. The graphic calls are supported by a video driver 80 which provides output to a display monitor 82 seen by the user. Data and commands input by the user such as by a keyboard 84 are accepted by the UI at the system level and processed by the responsible application such as by an active Java applet.

Figure 5:
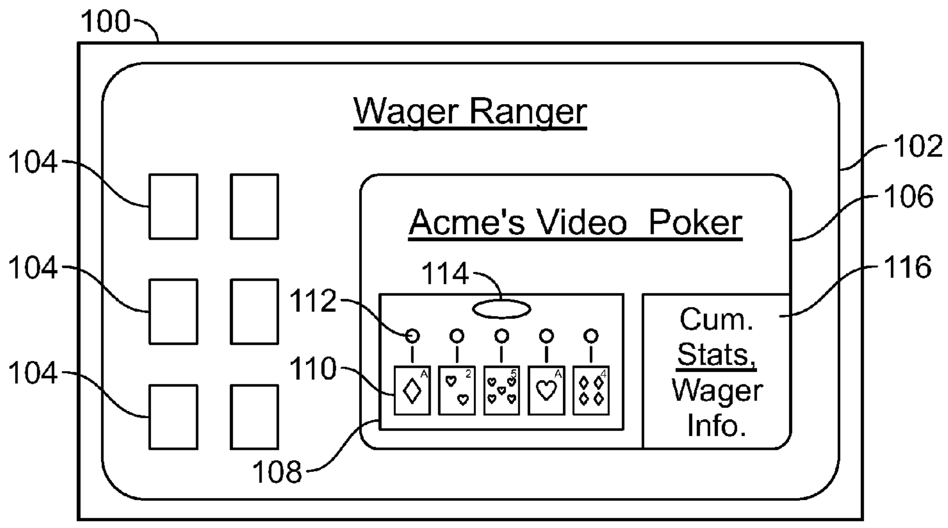
FIG. 5 is an illustrative screen view as displayed on a user's monitor in accordance with an embodiment of the present invention.

FIG. 5 shows an illustrative view of a screen 102 as seen on monitor 100 by a user of a personal computer, e.g. computer 20. In this example the user is engaged in the play of a wagering game in which the critical data associated with the play of the game is controlled by the vendor associated with source server 12. However, the game is presented through host server 14 that hosts the web page being accessed by the user. The owner or vendor associated with host server 14 is not affiliated with the vendor associated with source server 12. As used herein a "not affiliated" relationship means that the vendor associated with source server 12 does not own or have the right to control the general operation or content of host server 14. A series of icons 104 is presented on screen 102 where each icon corresponds to a different game that can be selected by the user for play. In this example, the web page as represented by the illustrative image on screen 102 would be known to users as the "WAGER RANGER" site. This would represent a known web site by which a user can select and play a variety of different games associated with icons displayed on this web page.

Window 106 located within the boundaries of screen 102 is associated with a game, ACME'S VIDEO POKER, created by the vendor (Acme) of source server 12 that is selected for play by the user. The user would first select and click on a displayed icon corresponding with window 106 in order to cause window 106 to open and become the active window in the screen. In this example, Java applets associated with window 106 and utilized in the interactive play of the associated game are downloaded to the user's computer from the host server 14, or from the source server 12 through the host server 14, as part of opening the window 106, unless the Java applets already reside on the user's computer. The Java applets will contain instructions and data for rendering the image of window 106, and for handling active objects displayed within window 106 such as associated with transmitting user input and/or selections. Window 106 includes all types of graphic image areas capable of interactive communications, e.g. a pop-up window, etc.

In this example an inner window 108 located within window 106 displays the cards 110 associated with the play of the video poker game. Assuming the game is draw poker, five cards initially dealt in a game will be displayed to the user. Controls 112 which consist of user selectable objects are associated with each card and permit the user to identify which of the cards will be discarded and replaced with different cards to form the final hand. Another object control 114 is used to signify that the user has completed the selection of cards to be discarded and is ready for the replacement cards to be received and displayed in place of the cards discarded. Another inner window 116 contains other information associated with the play of the game such as cumulative statistics and wager information. This window may also contain objects representing information that can be entered by the user, such as the amount of the wager for each poker hand and whether another poker hand is to be played. Objects shown in the windows can be displayed in two or three dimensional perspective.

In the illustrative embodiment the Java applets resident on the user's computer may contain sufficient instructions and data to maintain the ongoing operation of window 106 independent of the need for the receipt of instructions or data from the source server 12, except with regard to critical information. As used herein "critical information" means instructions or data associated with regulated wagering activities such as limits on the amount of permitted wagers, required game control statistics, and data associated with controlling the outcome of the game, e.g. which cards are dealt in the illustrative example. Critical information is requested from the user's computer, such as by a Java applet, from the source server 12 and provided by the source server 12 to the user's computer. This request and the reply to it are preferably routed through host server 14 so that the host server can monitor continuity of game play.

It should be remembered that while the user is playing a game presented in window 106 that has critical information controlled by source server 12, the remainder of the screen 102 outside of window 106 is defined by the web page controlled independently by host server 14. The material presented on the screen 102 outside of window 106 cannot be controlled by the source server 12. This provides the vendor associated with a host server with the opportunity of structuring independent business arrangements with a variety of content providers. This also provides the content provider, e.g. the vendor of source server 12, the opportunity to have its content presented through different host servers. This permits a vendor of wagering games to allow different host vendors to present wagering games to users grouped with other subject matter as determined by the host vendors, while still maintaining control over critical information associated with the play of its games and hence maintaining compliance with legal requirements associated with the gaming industry.

Figure 6:
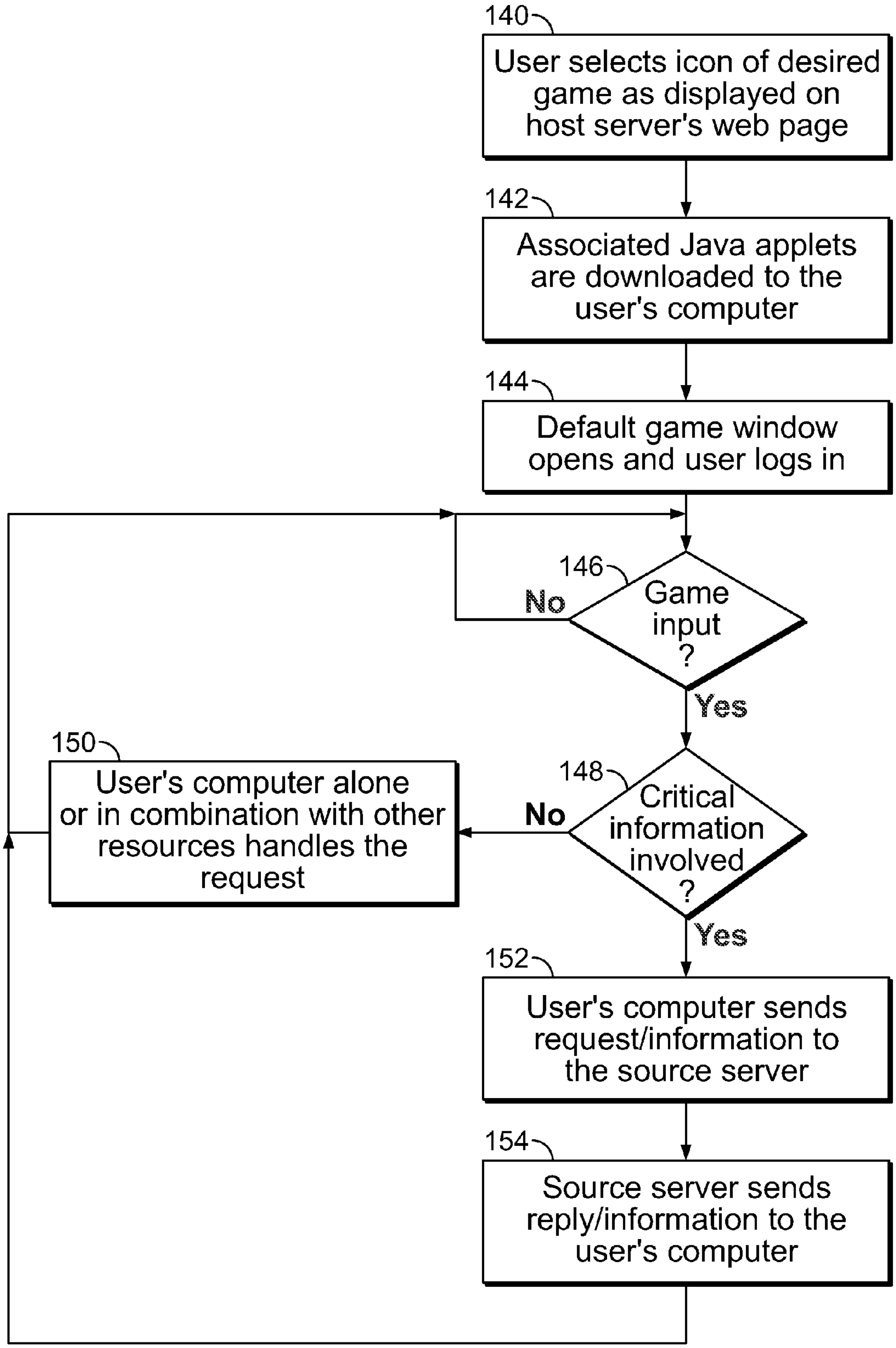
FIG. 6 is a flow chart of an illustrative method in accordance with an embodiment of the present invention.

FIG. 6 is a flow diagram of a method in accordance with an embodiment of the present invention. In step 140 a user selects the icon of a desired game associated with a source server as displayed on the host server's web page. In step 142 associated Java applets are downloaded to the user's computer from the host server, if the Java applets are not already resident on the user's computer. In step 144 the default window for the selected game opens on the user's screen and the user logs in. The log in process will involve the source host since the identity of the user is required in order to authenticate the user's status for game play. The user may have already logged in to the host server in order to reach the web page with the selected game icon. The log in information previously provided by the user to the host server may be sufficient to be forwarded to the source host depending upon the information collected and the level of authentication required. If the previous log in information collected by the host server is not sufficient, a separate log in process by the user to the source server can be utilized.

A determination is made in step 146 of whether game input has been initiated. For example, various types of selections may be offered to the user in the game window during the play of the game. In NO determination by step 146 returns control of processing to the input of step 146 to await an input. A YES determination by step 146 results in another determination being made in step 148 of whether critical information is involved. In the illustrative example, selecting the cards in the dealt hand to be discarded (or to be kept depending upon the design of the game) would not represent critical information. However, clicking on the button to request new cards to replace the discarded cards would represent critical information since this information is relevant to the outcome determination. A NO determination by step 148 causes the user's computer alone or in combination with other resources to handle the request/information in step 150. Following this step processing returns to the input of step 146 to await further game input.

A YES determination by step 148, representing that critical information is involved, results in the user's computer sending the request/information to the source server in step 152. In step 154, the source server sends a reply/information to the user's computer. The source server may permit the host server to control variables associated with the game, e.g. how images are shown and other non-critical game variables. The source server may also determine the bandwidth with the host server, e.g. the source server may give bandwidth priority to communications from a certain class of host servers such as host servers that meet a minimum number of games played within a predetermined time. Following this step processing returns to the input of step 146. The process as described with regard to FIG. 6 continues to the completion of the play of the game. At the completion of the play of a game, the source server will update and cause game statistics and user account information to be displayed to the user. Since the user has already logged in with the source server, the user may elect to play the same game again or my elect to terminate the play of the selected game, thereby causing this game window displayed within the web page of the host server to close. Thereafter, the user is free to select another icon displayed on the web page of the host server and initiate further game play.

The servers and user's computer in one example employs one or more computer readable signal bearing tangible media that stores software, firmware and/or assembly language for performing one or more portions of one or more embodiments of the invention. The computer-readable signal-bearing tangible media in one example comprises one or more of a magnetic, electrical, optical, biological, and atomic data storage medium. For example, the computer-readable signal-bearing media may comprise floppy disks, magnetic tapes, CD-ROMs, DVD-ROMs, hard disk drives, USB flash memory and electronic memory modules.

The steps or operations described herein are only examples. There may be many variations to these steps or operations without departing from the spirit of the invention. For instance, the steps may be performed in a differing order, or steps may be added, deleted, or modified. Two or more windows associated with game play can be simultaneously displayed, e.g. one for user game play and another associated window, such as a chat window for conversation by the user with others playing the game, a game playing coach, etc.

Each of these embodiments and obvious variations thereof are contemplated as falling within the spirit and scope of the claimed invention, which is set forth in the following claims.

What is claimed is:

1. A method implemented by a host server which supports wagering on games comprising the steps of:

transmitting a web page to a user's computing device, the web page including a plurality of icons each associated with a corresponding wagering game of a plurality of wagering games available for play on the user's computing device, a first of the wagering games being available for play under the control of a first source server and a second of the wagering games being available for play under the control of a second source server distinct from the first source server, the plurality of icons including a first icon associated with the first wagering game and a second icon associated with the second wagering game, the web page configured for display on a screen of the user's computing device;

hosting by the host server the web page, wherein the host server is not affiliated with the first source server or with the second source server;

downloading to the user's computing device at least a module of an application support service that supports play of the first wagering game upon receipt of a signal from the user's computing device indicating a selection of the first icon;

causing a window to be displayed within the web page on the screen of the user's computing device where the window presents the first wagering game for play, the application support service being part of a software structure that is supported by system level software, the application support service including instructions and data for rendering images of the first wagering game in the window and for handling active objects displayed in the window;

receiving from the user's computing device a request for critical information required for play of the first wagering game and routing the request to the first source server, wherein the critical information includes instructions or data associated with regulated wagering activities;

receiving from the first source server a reply to the critical information request and routing the reply to the user's computing device for display in the window, thereby permitting play of the first wagering game within the window of the web page as displayed on the screen of the user's computing device;

the host server causing material outside of the window on the web page to be displayed on the screen of the user's computing device, wherein the material is controlled by the host server independently of the first or the second source servers such that the material cannot be controlled by the first source server or by the second source server; and receiving a second signal indicating a selection of the second icon.

2. The method of claim 1 further comprising the step of requests for non-critical information by the user's computing device not being routed to the first source server.

3. The method of claim 1 further comprising the step of displaying images on said web page outside of the window being determined only by an owner of the host server.

4. The method of claim 1 wherein the at least a module of the application support service supports rendering of the window and images within the window.

5. The method of claim 1, further comprising:

receiving from the user's computing device a signal to terminate play of the first wagering game;

downloading to the user's computing device at least a module of a second application support service that supports play of the second wagering game upon receipt of a signal from the user's computing device indicating selection of the second icon;

causing a window to be displayed within the web page on the screen of the user's computing device where the window presents the second wagering game for play;

receiving from the user's computing device a second request for critical information required for play of the second wagering game and routing the second request to the second source server;

receiving from the source server a second reply to the critical information request and routing the second reply to the user's computing device for display in the window, thereby permitting play of the second wagering game within the window of the web page as displayed on the screen of the user's computing device, wherein the first wagering game on the source server is provided by a vendor that is different from a vendor that provides the second wagering game on the second source server.

6. A host server that supports wagering on games comprising:

microprocessor-based processing unit adapted to transmit a web page to a user's computing device, the web page including a plurality of icons each associated with a corresponding wagering game of a plurality of wagering games available for play on the user's computing device, a first of the wagering games being available for play under the control of a first source server and a second of the wagering games being available for play under the control of a second source server distinct from the first source server, the plurality of icons including a first icon associated with the first wagering game and a second icon associated with the second wagering game, the web page configured for display on a screen of the user's computing device;

the microprocessor-based processing unit adapted to host the web page, the host server not being affiliated with the first source server or with the second source server;

the microprocessor-based processing unit adapted to download to the user's computing device at least a module of an application support service that supports play of the first wagering game upon receipt of a signal from the user's computing device indicating a selection of the first icon;

the microprocessor-based processing unit adapted to cause a window to be displayed within the web page on the screen of the user's computing device where the window presents the first wagering game for play;

the microprocessor-based processing unit adapted to receive from the user's computing device a request for critical information required for play of the first wagering game and route the request to the first source server;

the microprocessor-based processing unit adapted to receive from the source server a reply to the critical information request and route the reply to the user's computing device for display in the window, thereby permitting play of the first wagering game within said window of the web page as displayed on the screen of the user's computing device;

the microprocessor-based processing unit adapted to cause material outside of the window on the web page to be displayed on the screen, wherein the material is controlled by the host server independently of the first or the second source servers such that the material cannot be controlled by the first source server or by the second source server; and the microprocessor-based processing unit adapted to download to the user's computing device at least a module of a second application support service that supports play of the second wagering game upon receipt of a second signal indicating a selection of the second icon.

7. The host server of claim 6 further comprising the microprocessor-based processing unit adapted to handle requests for non-critical information from the user's computing device by not routing requests for non-critical information to the first source server.

8. The host server of claim 6 further comprising the microprocessor-based processing unit adapted to display images on said web page outside of the window determined only by an owner of the host server.

9. The host server of claim 6 wherein the at least a module of the application support service supports rendering of the window and images within the window.

10. A method implemented by a source server which supports wagering on games comprising the steps of:

the source server transmitting and receiving messages with a first host server where the first host server transmits a web page to a user's computing device, the web page including a window having a first wagering game available for play within the window, the web page including a plurality of icons each associated with a corresponding wagering game of a plurality of wagering games available for play on the user's computing device, the first wagering game being available for play under the control of the source server, wherein the first host server hosts the web page and causes material outside the window on the web page to be displayed on a screen of the user's computing device, the material being controlled by the first host server independently of the source server such that the source server does not control any images displayed on the web page outside the window;

the source server transmitting and receiving messages with a second host sever that transmits a second web page to the user's computing device, the second web page including a second window including a second wagering game available for play within the second window of the second web page, the second wagering game being played under control of the source server, wherein the second host server hosts the second web page and causes material outside the second window on the second web page to be displayed on the screen, wherein the material is controlled by the second host server independently of the source server such that the source server does not control any images displayed on the second web page outside the second window, wherein the source server is not affiliated with the first host server or with the second host server, receiving a request for critical information from the first host server in response to a request for critical information received from the user's computing device by the first host server, the critical information being required for play of the first wagering game and including instructions or data associated with regulated wagering activities;

receiving a second request for critical information required for play of the second wagering game;

transmitting a reply to the critical information request from the first host server to the user's computing device via the first host server for display in the window, thereby permitting play of the first wagering game within the window of the web page as displayed on a screen of the user's computing device; and transmitting a second reply to the second critical information request to the user's computing device for display in the second window, thereby permitting play of the second wagering game within the second window of the second web page, wherein requests for non-critical information by the user's computing device received at the first host server or at the second host server are not routed to the source server.

11. The method of claim 10 further comprising the step of requests for non-critical information by the user's computing device received at the first host server not being routed to the source server.

12. A source server which supports wagering on games comprising the steps of:

a microprocessor-based processing unit adapted to transmit and receive messages with a first host server where the host server transmits a web page to a user's computing device, the web page including a window having a first wagering game available for play within the window, the web page including a plurality of icons each associated with a corresponding wagering game of a plurality of wagering games available for play on the user's computing device, the first wagering game being available for play under the control of the source server, wherein the first host server hosts the web page, is not affiliated with the source server, and causes material outside the window on the web page to be displayed on a screen of the user's computing device, the material being controlled by the first host server independently of the source server such that the source server does not control any images displayed on the web page outside the window;

the microprocessor-based processing unit adapted to transmit and receive messages with a second host server that transmits a second web page to the user's computing device, the second web page including a second window including a second wagering game available for play within the second window of the second web page, the second wagering game being played under control of the source server, wherein the second host server is not affiliated with the first host server and causes material outside the second window on the second web page to be displayed on the screen, wherein the material is controlled by the second host server independently of the source server such that the source server does not control any images displayed on the second web page outside the second window;

the microprocessor-based processing unit adapted to receive a request for critical information from the first host server in response to a request for critical information received from the user's computing device by the first host server, the critical information being required for play of the first wagering game;

the microprocessor-based processing unit adapted to receive a second request for critical information originated by the user's computing device;

the microprocessor-based processing unit adapted to transmit a reply from the first host server to the critical information request to the user's computing device via the first host server for display in the window, thereby permitting play of the first wagering game within the window of the web page as displayed on a screen of the user's computing device; and the microprocessor-based processing unit adapted to communicate a second reply to the second critical information request for display in the second window, the second reply being received by the user's computing device, thereby permitting play of the second wagering game within the second window, wherein requests for non-critical information by the user's computing device received at the first host server or at the second host server are not routed to the source server.

13. A tangible computer readable storage medium encoded with instructions for controlling a host server that supports wagering games comprising:

computer readable storage instructions for transmitting a web page to a user's computing device, the web page including a plurality of icons each associated with a corresponding wagering game of a plurality of wagering games available for play on the user's computing device, a first of the wagering games being available for play under the control of a first source server and a second of the wagering games being available for play under the control of a second source server distinct from the first source server, the plurality of icons including a first icon associated with the first wagering game and a second icon associated with the second wagering game, the web page intended for display on a screen of the user's computing device;

computer readable storage instructions for hosting the web page, wherein the host server is not affiliated with the first source server or with the second source server;

computer readable storage instructions for downloading to the user's computing device at least a module of an application support service that supports play of the first wagering game upon receipt of a signal from the user's computing device indicating a selection of the first icon;

computer readable storage instructions for causing a window to be displayed within the web page on the screen of the user's computing device where the window presents the first wagering game for play;

computer readable storage instructions for receiving from the user's computing device a request for critical information required for play of the first wagering game and routing the request to the first source server;

computer readable storage instructions for receiving from the first source server a reply to the critical information request and routing the reply to the user's computing device for display in the window, thereby permitting play of the first wagering game within the window of the web page as displayed on the screen of the user's computing device;

computer readable storage instructions for causing material outside of the window on the web page to be displayed on the screen, wherein the material is controlled by the host computer independently of the first or the second source servers; and computer readable storage instructions for receiving an indication of a selection of the second icon.

14. A tangible computer readable storage medium encoded with instructions for controlling a source server that supports wagering games comprising:

computer readable storage instructions for transmitting and receiving messages with a first host server where the first host server transmits a web page to a user's computing device, the web page including a window having a first wagering game available for play within the window, the web page including a plurality of icons each associated with a corresponding wagering game of a plurality of wagering games available for play on the user's computing device, the first wagering game being available for play under control of the source server, wherein the first host server hosts the web page, is not affiliated with the source server, and causes material outside the window on the web page to be displayed on a screen of the user's computing device, the material being controlled by the first host server independently of the source server such that the source server lacks control over images displayed on the web page outside the window;

computer readable storage instructions for transmitting and receiving messages with a second host server adapted to transmit a second web page to the user's computing device, the second web page including a second window having a second wagering game available for play, the second wagering game being played under control of the source server, wherein the second host server hosts the second web page, is not affiliated with the source server, and causes material outside the second window to be displayed on the screen, wherein the material is controlled by the second host server independently of the source server such that the source server lacks control over images displayed on the second web page outside the second window;

computer readable storage instructions for receiving a request for critical information from first the host server in response to a request for critical information received from the user's computing device by the first host server, the critical information being required for play of the first wagering game;

computer readable storage instructions for receiving a second request for critical information required for play of the second wagering game, the second request being originated by the user's computing device;

computer readable storage instructions for transmitting a reply to the critical information request from the first server to the user's computing device via the first host server for display in the window, thereby permitting play of the first wagering game within the window of the web page as displayed on a screen of the user's computing device; and computer readable storage instructions for communicating a second reply to the second request for display in the second window, thereby permitting play of the second wagering game within the second window, an indication of the second reply being received at the user's computing device.

* * * * *